United States Patent [19]

Prydtz

[11] Patent Number: 4,635,785
[45] Date of Patent: Jan. 13, 1987

[54] SORTER CONVEYOR HAVING LATERALLY TILTABLE TRAYS

[75] Inventor: Ole Prydtz, Hjortshøj, Denmark
[73] Assignee: Kosan Crisplant A/S, Aarhus, Denmark
[21] Appl. No.: 767,044
[22] Filed: Aug. 19, 1985
[30] Foreign Application Priority Data
Aug. 20, 1984 [DK] Denmark .............................. 3975/84
[51] Int. Cl.⁴ ...................... B65G 47/38; B65G 47/94; B07C 9/00
[52] U.S. Cl. .................................... 198/365; 209/707; 209/912; 209/698; 198/477.1; 198/802; 269/58
[58] Field of Search ............... 209/560, 655, 698, 707, 209/912; 198/365, 802, 477.1; 269/58

[56] References Cited

U.S. PATENT DOCUMENTS

| | | | |
|---|---|---|---|
| 3,669,245 | 6/1972 | Wooten et al. | 198/365 |
| 4,139,088 | 2/1979 | Olesen | 198/365 |
| 4,378,062 | 3/1983 | Macrum | 198/365 |

Primary Examiner—Robert B. Reeves
Assistant Examiner—Scott H. Werny
Attorney, Agent, or Firm—Antonelli, Terry & Wands

[57] ABSTRACT

For controlling the selective lateral tilting of the conveying trays of a sorter conveyor there is provided, on each tray support, a crosswise oriented cylinder, which by a protruding radial arm, is turnable between a "normal" position and a "tilt" postion in response to the radial arm engaging with an actuated guiding track associated with the stationary conveyor chassis. The tray has a lever engaging with an oblique cam track in the surface of the cylinder, whereby the tray is tilted by the turning of the cylinder. The cam track has non-oblique end portions, which lock the tray in both its horizontal and fully tilted position, without a separate lock being required. The cylinder may be split in two individually turnable halves selectively operable to tilt the tray to either side.

4 Claims, 10 Drawing Figures

U.S. Patent  Jan. 13, 1987  Sheet 1 of 3  4,635,785
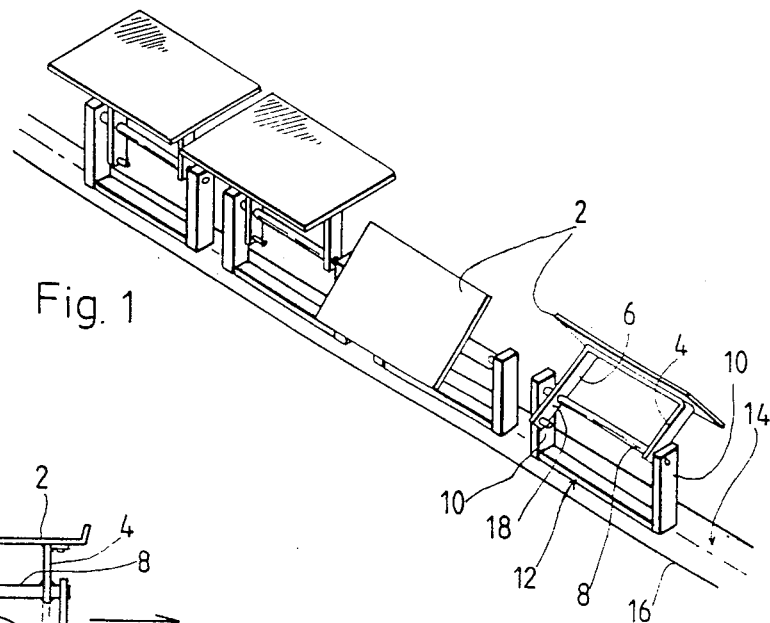
Fig. 1
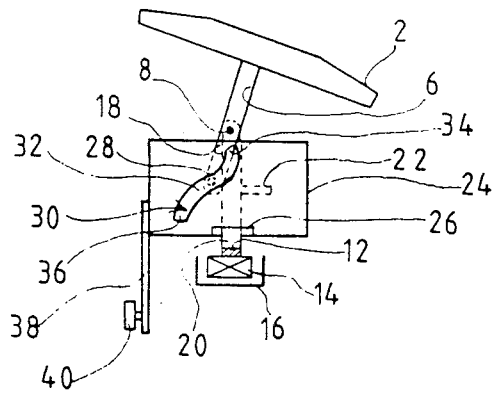
Fig. 2
Fig. 3

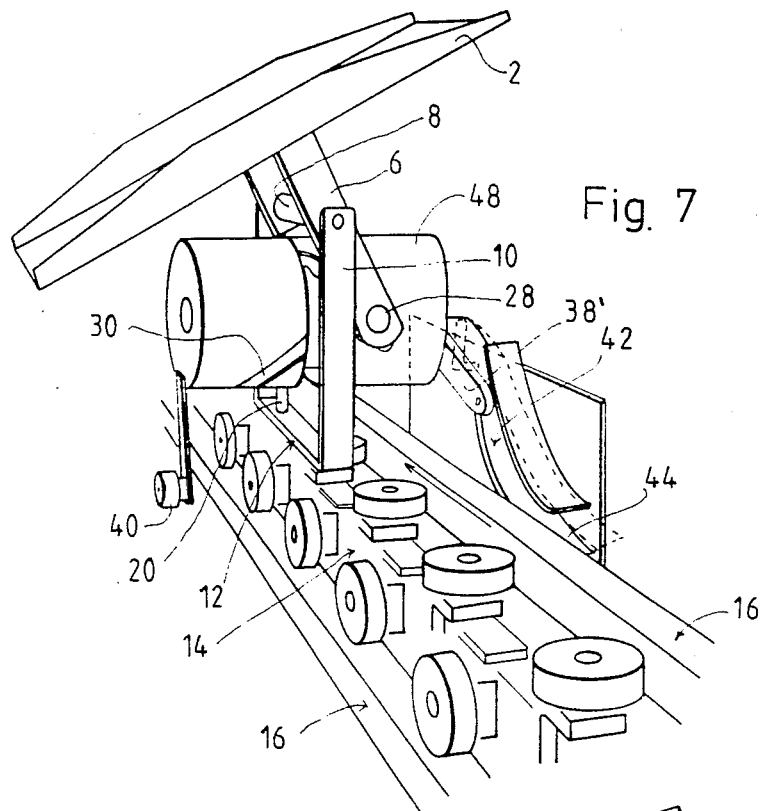
Fig. 7
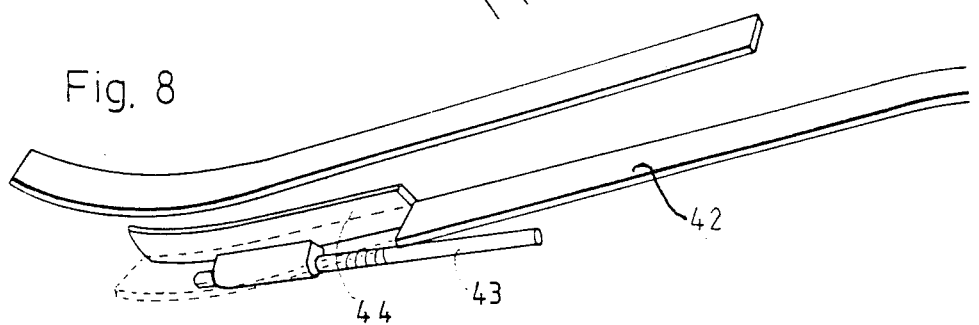
Fig. 8
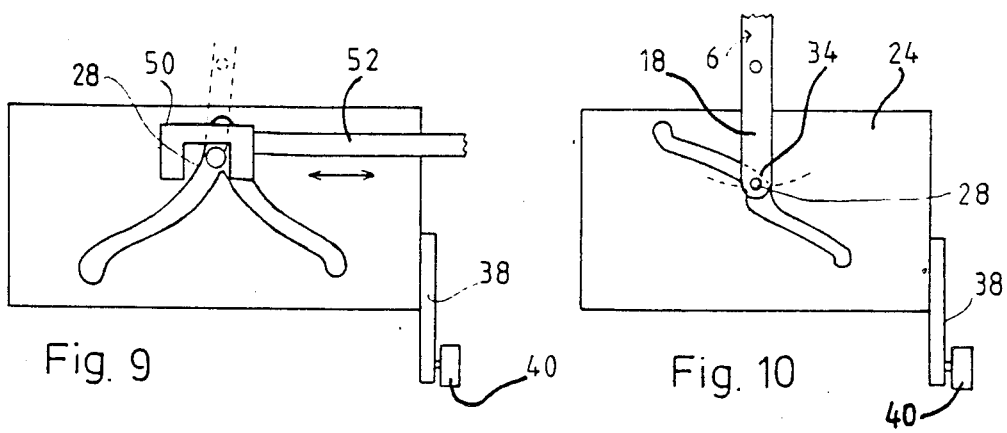
Fig. 9
Fig. 10

SORTER CONVEYOR HAVING LATERALLY TILTABLE TRAYS

BACKGROUND OF THE INVENTION

The present invention relates to a sorter conveyor of the type comprising a preferably endless row of laterally tiltable trays, which are moved forwards on associated carrier means along a conveyor chassis between one or several loading stations and a number of receiver stations, in which are provided selectively operable activation means for effecting that selected trays via a tilting mechanism are tipped laterally for unloading of the object or objects transported on the tray. For effective utilization of the sorter conveyor the receiver stations should be situated closely to each other and on both sides of the conveyor, i.e. the trays should be tiltable to both sides.

It is a practical necessity that the trays be effectively locked in their horizontal position, until they are to be tilted, and the tilting mechanism should thus comprise a lock, which is released before the tilting action itself. Such devices are known in several embodiments, but common to the known devices is that the combined tilting and locking mechanisms consist of a rather large number of parts, which must cooperate and be mounted with quite narrow tolerances.

SUMMARY OF THE INVENTION

The purpose of the invention is to provide a simple locking and tilting mechanism which works in a reliable manner with no particularly high tolerance requirements.

According to the invention this is obtained by the sorter conveyor being designed as indicated by the characterizing clause of claim 1. For tilting the tray it is hereby sufficient to effect a certain turning of the cylinder member, and this member with its associated fixed pin may constitute the entire movable system of the tilting mechanism. When the cylinder member is turnable with a certain friction the cam track follower member or pin of the tray will not be able to cause a turning of the cylinder member by an outer tilting effect on the tray, whereby the tray will be locked in the desired manner. This locking action may be further improved by the features indicated in claims 2 and 3, an absolute locking of the tray in its horizontal position and even in its entirely tilted position being obtainable simply by a suitable shape of the track, the cylinder member not needing to be tardily turnable, and the release from the locked positions is effected very easily by turning of the cylinder member.

This system may be adapted to make possible a bilateral tiltability of the tray, by which only a turning of the cylinder body must be provided for, this turning must be in mutually opposite directions according to whether the tilting is to be effected to one side or to the other; alternatively the cylinder member may be turned in the same direction in both cases by using a V-shaped guiding track, whereby it is only required to actuate a track selector for whether the track follower pin is to run in one or the other branch of the guiding track.

For the bilateral tilting of the tray, however, the arrangement indicated in claim 5 is preferred, whereby the cylinder member is in two parts, the two parts being individually turnable by cooperation with individual activation means. In the horizontal position of the tray the track follower pin is locked in a common overlap area of the two guiding tracks, and by two-parting of the cylinder member there is no need for special track selector means, as the track follower pin will follow the track part on that of the elements, which is activated for turning.

BRIEF DESCRIPTION OF THE DRAWINGS

The invention is described in more detail in the following with reference to the drawing, in which FIG. 1 is a schematic perspective view of a section of a sorter conveyor with tiltable trays, FIGS. 2 and 3 are plan views for illustration of the principle of the invention, FIG. 7 is a perspective view for illustration of the guiding of the cylinder member, FIG. 8 is a perspective view of the associated guiding members, and FIGS. 9 and 10 are plan views of modified cylinder bodies.

DESCRIPTION OF THE PREFERRED EMBODIMENTS

Figure 4:
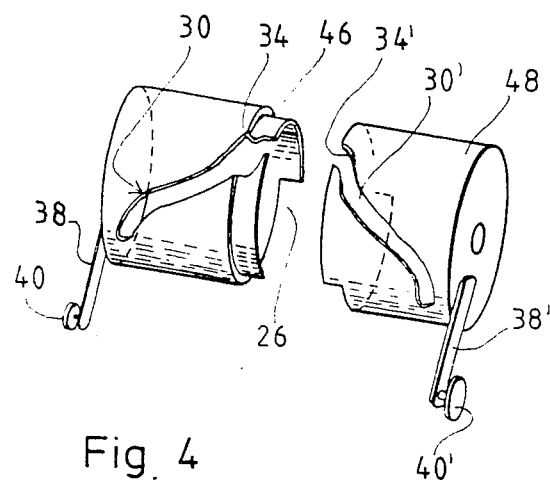
FIG. 4 is a perspective view of a cylinder member in two parts.

In FIG. 1 is shown a part of a sorter conveyor of the tilting tray type. The trays designated 2 are positioned on a carrier bracket with downwardly projecting arms 4 and 6, which are mounted in a laterally tiltable manner on a longitudinally oriented rigid axle 8, which extends between a couple of upright branch members 10 of a carrier cradle 12, which is rigidly connected to an underlying conveyor chain 14. This chain is moved in a non-tiltable manner along an only schematically represented conveyor chassis 16. The arms 6 have a prolongation 18 below the axle 8, this prolongation cooperating with below mentioned means for guiding the lateral tipping of each tray 2.

The parts here mentioned will also be found in FIG. 2 and partly in FIG. 3. It is furthermore indicated in these figures that approximately in the middle of the lower part of the rigid carrier cradle an upwardly projecting, fixed arm member 20 is positioned, which at the top is equipped with a transverse pin 22, on which is turnably deposited a cylinder member 24. This consists of two parts and has a recess 26 from the middle to the bottom, which allows the two parts to be connected by insertion on to the opposite ends of the transverse pin, the arm member 20 hereby projecting through the recess 26. As indicated in FIG. 2 this recess extends somewhat upwardly to the rear side of the cylinder member as shown from the front in FIG. 3, so that the cylinder member is turnable through a certain angle clockwise from the position shown in FIG. 2 (and FIG. 3).

On the downwardly projecting arm member 18 is mounted a cam track follower pin 28, which projects into a track 30 on the surface of the cylinder member. This track is S-shaped, with a central oblique part 32, which ends in peripherally extending track parts 34 and 36 by the middle and by the opposite end of the cylinder member 24, respectively.

The cylinder member has at its one end a protruding radial arm member 38 with an outer track follower roller 40, which by passing into a guiding track 42, fixed relatively to the conveyor chassis, FIG. 2 may be brought to turn the cylinder member somewhat in the mentioned direction, before the roller 40 leaves the upper end of this track 42. FIG. 3 shows the situation intermediately during this turning.

From the start the cam track follower pin 28 is positioned in the upper, central part 34, whereby the arm 6,18 is vertical, i.e. the associated tray 2 is horizontal in a stabilized position, since the pin 28 cannot be laterally moved in the track part 34. By the turning of the cylinder body, which will be effected when a lower track part 44 of the track 42 is brought to assume an active position as shown in FIG. 2, the track 30 in the cylinder member will be guided upwards (FIG. 3), and the pin 28 will thus be forced outwards for swinging of the arm 18,6 and thereby for lateral tilting of the tray 2. At the end of the turning movement of the cylinder body the pin 28 will be positioned at the outer end of the track part 36, whereby the tray 2 is maximally tipped and stabilized in this position because the track part 36 extends in the peripheral direction of the cylinder member, whereby a side pressure on the track walls give no turning momentum to the cylinder member.

The radial arm 38 may later, before the arrival of the tray in an unloading station, be actuated to turn back the cylinder member 24 for swinging motion of the tray 2 into a horizontal position.

Figure 5:
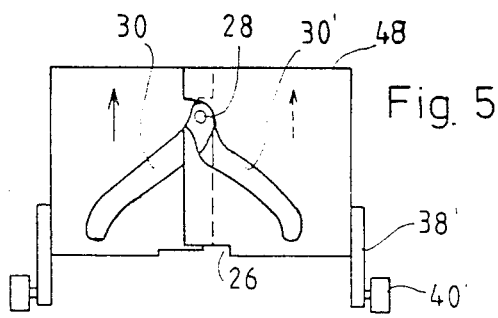
FIGS. 5 and 6 are plan views of the same.
Figure 6:
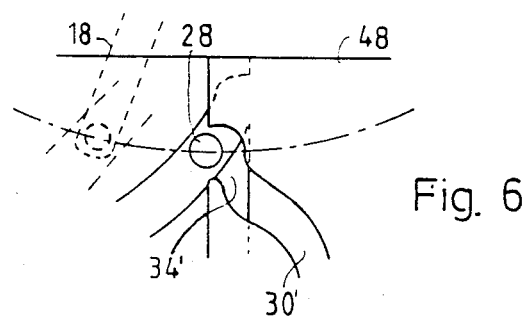

By the arrangement shown in FIG. 3 the tray 2 can only swing to one side, but in FIGS. 4-6 is shown a cylinder member, which will make possible a selective tilting to both sides. Also this cylinder member is in two parts, with generally symmetric guiding tracks 30 and 30' shaped in both halves, the upper track parts 34 being laterally open towards each other.

In the left half of the cylinder member the track portion 34 is provided in a flange portion 46 having a reduced diameter suitable for inside reception in the mouth of the right half of the cylinder member, such that the track parts 34 and 34' overlap each other in the assembled condition of the two halves, see FIG. 5. Also the right half of the cylinder member is provided with a radial arm 38' with an outwardly projecting track follower roller 40'.

By turning the left half of the cylinder member in the above manner, the result will be exactly as described above, namely that the track follower pin 28 will be forced outwards to the left, which may be effected unobstructedly because the pin may simply be laterally displaced out of the track part 34' in the right half 48 of the cylinder body, this being illustrated in FIG. 6.

However, it will correspondingly apply that the right half 48 of the cylinder body may be turned separately by actuating the radial arm 38', and that the track follower pin 28 will hereby be forced laterally out of the track part 34 and into the track 30', whereby the tray 2 will swing to the opposite side.

Regardless of the side to which the tray 2 has been tilted, it will be returned to its horizontal position when both track follower rollers 40 and 40' pass fixed guiding curve parts, which effect the radial arms 38 and 38' to be swung downwards if they are not already assuming a swung down position.

If the track wall part 44 is removed from its position shown in FIGS. 2 and 7, the roller 40 will pass unhinderedly and unaffectedly past the lower end of the quiding track 42 without being forced upwards, and the wall part 44 will thereby constitute the activating member that is usable for selective activation of the by-passing trays. The switching of the wall part 44 may be effected in many ways, but a preferred manner is shown in FIG. 8, where the wall part is positioned in a swingable manner about an outer, longitudinally extending axle 43, such that it e.g. by means of a non-indicated electromagnetic activator may be swung between the shown inactive position and the active position, indicated by dotted lines.

The cylinder member should not necessarily be in two parts with individually turnable halves, since a corresponding effect may be obtained by turning a one-piece cylinder body with a V-shaped guiding track as shown in FIG. 9, provided only that guiding means are provided which can be activated for selective guiding of the track follower pin to one side or the other of the common top area of the V-track. In FIG. 9 this is illustrated by a track selector element 50 being axially switchable by displacement of a carrier arm 52, whereby a tilting of the tray 2 to either side may be actuated by one same turning actuation by the radial arm 38 and an associated easily obtainable displacement of the arm 52 for determination of the side, to which the tray is to tilt.

In FIG. 10 is shown another example, by which the cylinder member has the same central track part 34 as considered above, while the track portions extending from there to both sides do not form a V-shape, but a shape in which they are generally in line with each other, whereby the associated tray 2 will be tilted to one side or to the other, depending on whether the cylinder member 24 is affected via the radial arm 38 to turn one way or the other. In this case the radial arm should assume a horizontal position, when the track follower pin is in the central part 34 of the track, and the activating means should be conditioned for selectively swinging the radial arm upwards or downwards, depending on whether the tray is to tilt to one side or to the other.

Instead of activating the guiding track 42 by a downwards swinging of the track wall part 44, as shown in FIG. 8, this part 44 may be caused to swing inwards about a vertical axis through its upper end, or the entire track part 42,44 may be swingable, as shown by dotted lines in FIG. 7.

As suggested by dotted lines in FIG. 2, both carrier arms 4 and 6 may be downwardly prolonged for cooperation with the cylinder body 24, when this is equipped with symmetrical track sets on both sides, whereby an extra forceful guiding engagement is obtained.

It should be mentioned that an advantage of the system according to the invention is that the tilting of the trays may be effected in a pronouncedly non-noisy manner, as it is also an advantage that it is possible to produce a desired tilting characteristic for the trays by the adequate shaping of two different guiding tracks, namely both the activating track 42,44 and the track 32 in the cylinder member.

What is claimed is:

1. A sorter conveyor of the type comprising a preferably endless row of laterally tiltable trays, which are carried forwards on associated carrier means along a conveyor chassis, which in several places is provided with activating means for selective activation of a tilting mechanism for the individual by-passing trays, characterized in that the tilting mechanism for an individual tray comprises a cylinder member which is transversely oriented relative the conveying direction of the tray and is turnable about a substantially horizontal axis which is fixed relative to the carrier means of the tray, said cylinder member being equipped with obliquely extending cam guiding tracks, which cooperate with a cam member mounted track follower, radially spaced from the longitudinally extending tilting axis of the tray, on a carrier part connected to the tray, and the cylinder member having at least at one end an axially projecting pin located radially spaced from the axis of the cylinder member in such a manner that this pin by operatively engaging the said activating means can produce a turning of the cylinder member, whereby the obliquely extending cam guiding track of the cylinder member forces the said cam track follower member to carry out a transverse movement resulting in a lateral tilting of the associated tray.

2. A sorter conveyor according to claim 1, characterized in that the cam guiding track in the cylinder member has a first portion which extends in the peripheral direction of the cylinder member and thus produces a locking effect in transverse direction of or against a transverse movement of the cam track follower member of the tray, and that said first track portion continues in a second track portion which is oblique relative to both the peripheral and axial directions of the cylinder member.

3. A sorter conveyor according to claim 1 or 2, characterized in that the oblique cam guiding track in the cylinder member ends in a track portion which extends in the peripheral direction of the cylinder member.

4. A sorter conveyor according to claim 1, characterized in that the cylinder member viewed in its axial direction is segmented in two mutually turnable cylinder elements which at their outer ends are individually equipped with said projecting pin for producing a turning of the respective cylinder element by cooperation with the activating means at the respective side of the sorter conveyor, and that the two cylinder elements have interfacing overlap areas in which said projecting pin engages in the cam guiding track in both cylinder elements, each track portion being thus laterally open that it will allow the cam track follower member to move outwardly in the opposite track in response to the opposite cylinder element being turned.

* * * * *